United States Patent

Church, Jr.

[11] Patent Number: 6,064,559
[45] Date of Patent: May 16, 2000

[54] FIBER OPTIC POSITION SENSOR FOR TUNING CAPACITOR

[75] Inventor: Richard E. Church, Jr., Rochester, N.Y.

[73] Assignee: ENI Technologies Inc., Rochester, N.Y.

[21] Appl. No.: 09/020,836

[22] Filed: Feb. 9, 1998

[51] Int. Cl.[7] .................................................... H01G 5/06
[52] U.S. Cl. ........................ 361/277; 361/289; 361/272
[58] Field of Search ................................. 361/277, 278, 361/279, 283.1, 283.3, 287, 288, 289, 290, 291, 292, 298.1; 250/231.1, 559.27; 271/215; 356/138, 153

[56] References Cited

U.S. PATENT DOCUMENTS

| | | | |
|---|---|---|---|
| 2,308,694 | 1/1943 | Jenner | 361/289 |
| 3,495,142 | 2/1970 | Herrgen et al. | 361/289 |
| 3,496,431 | 2/1970 | Goetzl | 361/289 |
| 3,560,811 | 2/1971 | Farago | 361/289 |
| 3,662,235 | 5/1972 | Napolin | 361/289 |
| 3,968,364 | 7/1976 | Miller | 250/237 |
| 4,007,406 | 2/1977 | Weisbrod | 361/289 |
| 4,177,495 | 12/1979 | Perret | 361/289 |
| 4,390,924 | 6/1983 | Nebiker, Jr. | 361/279 |
| 4,953,057 | 8/1990 | Davidian | 361/289 |
| 5,590,015 | 12/1996 | Planta et al. | 361/277 |

*Primary Examiner*—Kristine Kincaid
*Assistant Examiner*—Eric W. Thomas
*Attorney, Agent, or Firm*—Bryan Cave LLP

[57] ABSTRACT

An optical position sensor for a vacuum tuning capacitor employs optic fibers that are positioned adjacent a nut associated with the guide shaft. A threaded lead screw is rotated to lift the nut and move the capacitor from a fully-withdrawn home position to a tuning position. A first fiber has its terminus aligned with the terminus of a second fiber to define a gap. A flag or shutter on the nut is positioned in the gap to block the light path between the fibers when the nut is in the home position, but is out of the gap to allow passage of light otherwise. This produces normally on signaling, giving the position sensor a fail-safe capability. The sensor can be incorporated into a cap or cover of the tuning capacitor.

11 Claims, 4 Drawing Sheets

FIBER OPTIC POSITION SENSOR FOR TUNING CAPACITOR

BACKGROUND OF THE INVENTION

This invention relates to devices for automatically sensing the home position of a driven element, such as the movable plates of a tuning capacitor. The invention is more particularly directed to a sealed servo tuning capacitor provided for impedance matching purposes with high power RF equipment such as plasma generation equipment. The invention is more particularly directed to a tunable capacitor for an automatic RF matching network to match the impedance of a reactive plasma chamber or similar non-linear load to a constant impedance (e.g., 50 ohms) output of an RF generator or similar RF source.

In a typical RF plasma generator arrangement, a high power RF source produces an RF wave at a preset frequency, i.e., 13.56 MHz, and this is furnished along a power conduit to a plasma chamber. The RF power is also typically provided at a fixed, known impedance, e.g., 50 ohms. Because there is typically a severe impedance mismatch between the RF power source and the plasma chamber, an impedance matching network is interposed between the two. There are non-linearities in the plasma chamber which make it difficult simply to set the impedance match network at fixed positions for a plasma process. For that reason, there are one or more variable tuning capacitors to adjust the line impedance to match the load impedance, and these are controlled by means of error signals, which can be derived from the measured magnitude and phase of the RF wave at the input of the impedance matching network. The phase and magnitude error signals drive servo motors associated with variable tuning capacitors, and drop to a low or zero level when a matched condition has been achieved.

Typically, expensive vacuum capacitors are employed for this purpose, in which the capacitor plates are hermetically sealed within a canister, with a guide shaft that is moved up and down, via a threaded lead screw, with a threaded nut affixed onto the guide shaft to engage the lead screw. In these vacuum capacitors, the movable and fixed plates are fully engaged when the guide shaft and nut are in the fully retracted (down) position, i.e., at the proximal end of travel. The capacitance is reduced as the guide shaft is lifted up, reaching a minimum at the other end of travel.

At the commencement of machine operation, it is crucial for the servo controller to establish the tuning capacitors' home positions, and then move the capacitors, by means of servo motors for example, towards appropriate tuned conditions. Typically, the home position is at one of the end points of travel, e.g., where the fixed and movable capacitor plates are fully engaged (maximum capacitance). At present this is accomplished using electromechanical devices, e.g., microswitches, that turn on to signal the process control microprocessor when the capacitor reaches the end position. An example of a variable capacitor integrating electromechanical end or limit switches is presented in Planta et al. U.S. Pat. No. 5,590,015. In that patent the limit switches are integrated into the capacitor assembly.

A recent proposal to accomplish the home position sensing using fiber optic methods has been to use a pair of fibers, one transmit and one receive. One fiber is fixed in position rigidly to the body of the capacitor, while the other is attached to the movable electrode guide shaft. The fibers are brought into alignment, completing the optical path, as the capacitor is driven into the home position. This proposal has an undesirable lack of any fail-safe capability. That is, the optical circuit is normally OFF. At start up, the stepper motor will drive the capacitor towards its home position, and will continue to drive the capacitor until the optical circuit indicates ON. If for some reason there is a failure in the optical circuit, e.g., a broken or misaligned fiber, or failed photodetector, the capacitor can be driven past the home position and can suffer irreversible damage.

Another recent proposal to accomplish position sensing with optical means employs a first optical fiber that emits light towards the tuning nut and guide shaft of the capacitor, and a second fiber that receives reflected light from the capacitor guide shaft and tuning nut. The semi-reflective surface on the tuning nut and guide shaft allows the circuit to be complete during the normal operating range of travel. The optical path is interrupted at the home position, where the tuning nut passes out of the field of view of the optical fibers, and light is incident on the threads of the lead screw. This method provides the desired normally-closed light path during normal operation, opening upon reaching the home position. The success of this technique depends upon the highly variable light attenuation of the guide shaft being differentiated from the light reflected back from the lead screw at the home position. The electronics necessary in the fiber optic module do not enjoy a cost advantage over the simpler mechanical means of the prior art.

The problems arising from overdriving past the end limit have required secondary mechanical hard limits, for example, an energy absorbing end stop of the type illustrated in Nebiker, Jr. U.S. Pat. No. 4,390,924.

OBJECTS AND SUMMARY OF THE INVENTION

It is an object of this invention to provide a vacuum tuning capacitor that avoids the drawbacks of the prior art.

It is another object of this invention to provide an arrangement for finding the home position of a tuning capacitor, and which enjoys a fail-safe feature that significantly reduces the probability of overdriving past the home position.

It is a further object to provide a normally-closed photo optical position sensor for a tuning capacitor which eliminates need for post-factory mechanical adjustment of the home position or limit detector.

According to an aspect of this invention, an optical end or limit detector is provided for a sealed servo-type variable tuning capacitor, e.g., a vacuum capacitor. This capacitor typically has its plates fitted within a hermetically sealed canister. There a set of fixed capacitor plates within the canister. A set of movable capacitor plates that meshes with the fixed plates is axially movable within the canister. A guide shaft is affixed to the movable plates and is movable axially with respect to the canister. A female-thread nut is affixed non-rotatably on the guide shaft and a threaded lead screw is fitted into the nut and is driven by a servo motor to rotate the lead screw to lift the nut and the movable plates. These parts are movable over an axial travel defined between a home position and at least one other position, typically between a fully retracted position and a fully extended position. The optical limit detector is in the form of an optical indexing arrangement, and detects whether the nut and the associated movable capacitor plates are in their home position. In this invention, optical transmitter means generate an optical beam, optical receiver means are oriented to receive the optical beam, and the beam travels on a path at a predetermined axial position within the travel of the nut. A flag mean, disposed on the nut blocks the optical beam on this path when the nut is in its home position, but is out of the path otherwise, permitting the optical beam to pass from the transmitter means to the receiver means when said nut is out of its home position.

Favorably, the optical transmitter means include a first optical fiber having a terminus positioned adjacent the nut at the home position and the optical receiver means includes a second optical fiber having a terminus positioned adjacent the nut and aligned with the first optical fiber, with the two termini defining a space therebetween. The flag means can take the form of a flat shutter member that is attached to the nut, or formed with it, and is located in the space between the fiber termini when the nut is in its home position.

In a preferred embodiment, there is a generally cylindrical cap member seated on the canister, with a thrust bearing for supporting the lead screw, and with its interior of sufficient diameter and length to accommodate the travel of the nut. Here, the cap member also supports the optical transmitter means and the optical receiver means. The cap member can have an axially extending slot guide for orienting with the flag means.

The set of fixed capacitor plates can in some cases be a single plate, suitably formed, i.e., in spiral or volute form. This is also the case for the set of movable capacitor plates. Also, the invention is not limited to lead-screw driven capacitors, but can apply also to capacitors with linearly driven (i.e., axially pulled) guide shafts.

The above and many other objects, features, and advantages of this invention will become apparent from the ensuing description of a preferred embodiment, which is to be read in conjunction with the accompanying Drawing.

DETAILED DESCRIPTION OF THE PREFERRED EMBODIMENT

Figure 1:
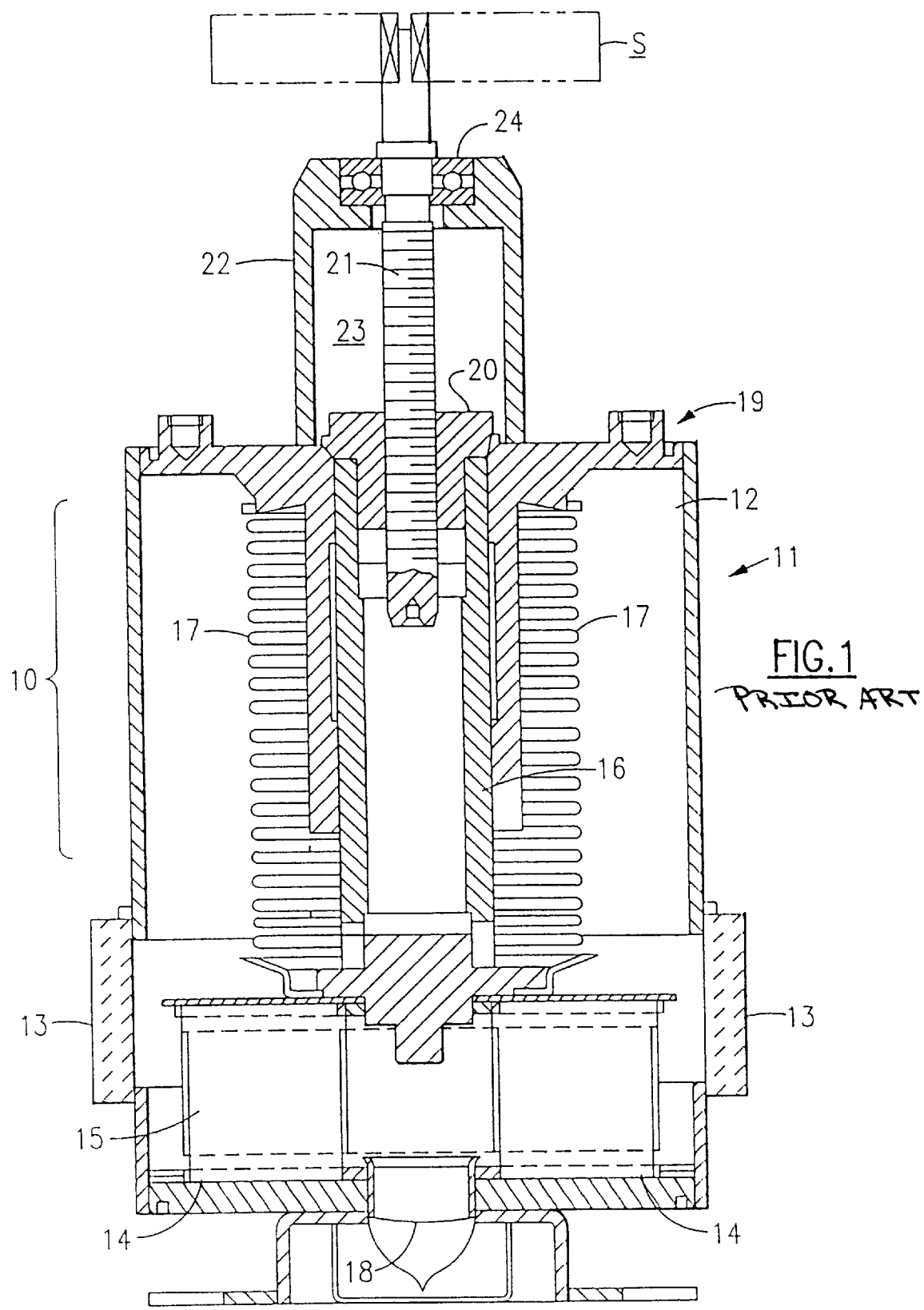
FIG. 1 is a sectional elevation of a vacuum variable capacitor, of the type which can incorporate the optical detector of this invention.

With reference to the Drawing figures, and initially to FIG. 1, a typical vacuum-type variable capacitor 10, shown in cross section, has a outer canister 11, having a metal can portion 12 and a ceramic insulator portion 13, with fixed capacitor plate(s) 14 disposed in the canister 11 at the lower part thereof. There are movable capacitor plate(s) 15 that mesh with the fixed plates 14. An axial guide shaft 16 is attached to the plates 15 to raise and lower them. The canister 11 is hermetically sealed by means of metal bellows 17, and air is pumped out during manufacture to effect a vacuum, with a nipple 18 (here at the base) being sealed at that time. At the top 19 of the canister 11 there is a female-threaded nut 20 that is affixed onto the top end of the guide shaft 16, with a male-threaded lead screw 21 fitted into the nut 20. A cap or cover 22 is situated on the top 19 of the canister, over the nut 20 and lead screw 21. This cap 22 has a generally cylindrical interior void 23 of sufficient length and diameter to accommodate the travel of the nut 20 as well as the associated guide shaft 16. A thrust bearing 24 is held in the upper part of the cap 22 to support the lead screw 21. A servo motor or other controllable drive mechanism (represented by the ghost-line box S) is coupled to the upper end of the lead screw. In known fashion, the lead screw is rotated to lift (or lower) the nut 20, and thereby move the capacitor plates 15 axially to change the capacitance within a capacitive range. The nut 20 is shown in a home position, in which the guide shaft 16 is fully retracted, and the capacitor plates 14, 15 are fully engaged. The nut can be lifted axially over a predetermined travel distance to an upper limit, in which the capacitor plates are minimally engaged, corresponding to the minimum of the capacitive range.

Figure 2:
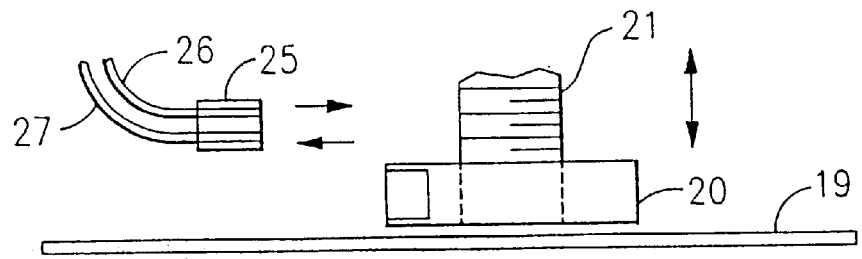
FIG. 2 schematically illustrates an optical detector of the prior art.

For reasons discussed previously, it is desirable to place the capacitor nut 20 in a home or initial position, and then change the capacitance by rotating the lead screw 21 and moving the nut 20 to another position. When the associated RF equipment is first turned on, the capacitor is placed in the home position, as shown here, and then the lead screw 21 is rotated to move the nut 20 away from the home position to a tuned position. In order to achieve the initial setting as quickly as possible, a position detector or indexing sensor is employed to detect when the nut 20 is in its home position. Typically, an electro-mechanical device, e.g., a microswitch, has been employed for this purpose, changing state when the nut reaches home. Recently, however, an optical equivalent to this arrangement has been proposed, which is illustrated schematically in FIG. 2. As shown there, an optical end detector 25 is positioned at the top 19 of the canister, adjacent the nut 20. The detector 25 has a first optical fiber 26 for transmitting an optical beam, e.g., infrared radiation, towards the nut, and a second optical fiber 27 positioned to receive reflected radiation. Reflective surfaces on the nut 20 and guide shaft 16 are oriented in the beam of radiation when the nut 20 is away from the fully down or home position. The sensor of this arrangement is configured as "normally-closed" or ON so that there is signal when the nut 20 and shaft 16 are out of their home position, but there is an OFF condition with no signal when the nut 20 is at the home position. Significantly, this arrangement requires a sophisticated, hence expensive, optical level discriminator to measure the light reflected from the nut 20 and guide shaft 16. The signal level is variable, depending on the reflectivity of the surfaces of the nut 20 and shaft 16, and this level must again be differentiated from the lower reflected light level from the screw 21.

Figure 3:
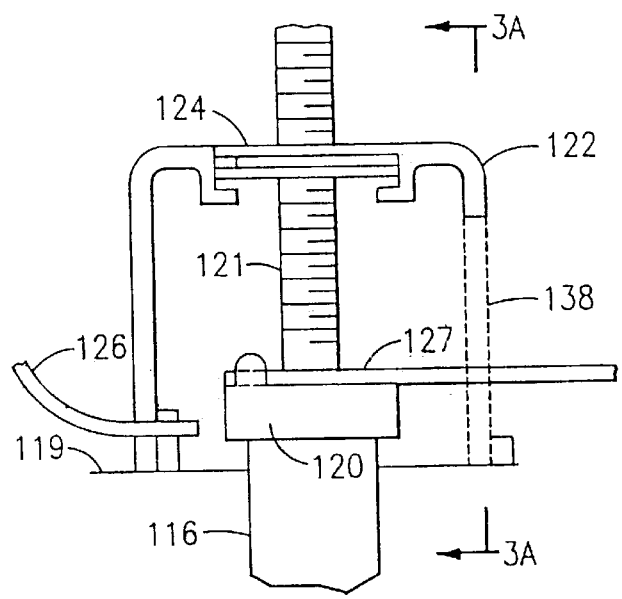
FIG. 3 illustrates another optical detector of the prior art.
Figure 3A:
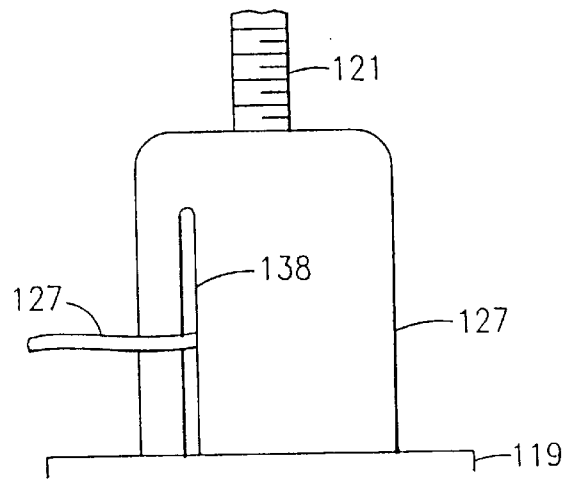
FIG. 3A is an elevation view of a portion of FIG. 3.

An example of another optical sensor arrangement of the prior art is shown in FIGS. 3 and 3A, in which reference numbers used previously to identify similar elements are used here but raised by 100. In this case, a first fiber 126 is mounted in a fixed position relative to the canister, here being affixed on the cap 122. Another fiber 127 is affixed onto the tuning nut 120, so as to be in alignment with the first fiber 126 when the capacitor is in the home position, but out of alignment otherwise. The second fiber 127 has to be free to travel up and down with the nut 120, and so an axial slot 138 is provided in the cap 122, as shown in FIG. 3A. The arrangement of FIGS. 3 and 3A lacks any fail-safe capability, as the associated control will continue to turn the lead screw 121 as long as there is no signal. If there is a failure of the sensor, e.g., a broken fiber or misalignment of parts, the sensor will be unable to detect that the nut 120 has reached the home position. This can result in forcible axial movement of the lead screw out of the cap 122. Irreversible damage to the capacitor or the servo drive assembly can result.

Figure 4:
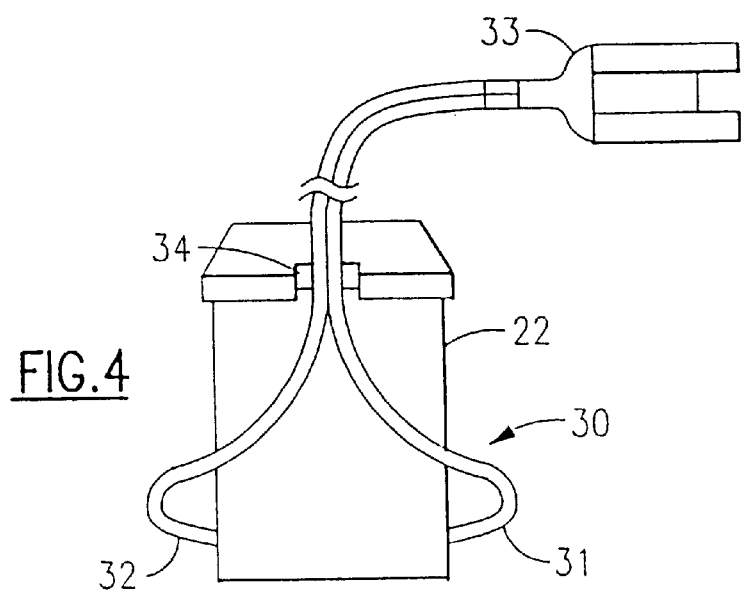
FIG. 4 is a perspective view of an end cap of the variable capacitor incorporating the end or limit detector of this invention.
Figure 8:
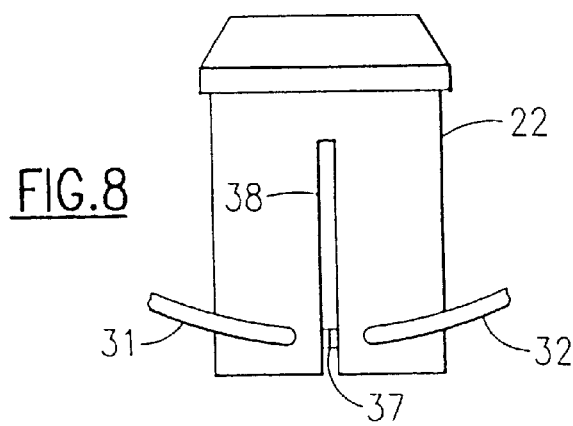
FIG. 8 is another view of the end cap employing the optical detector of this embodiment.

An end position index sensor 30 according to an embodiment of this invention is shown in FIG. 4, with reference also to FIGS. 5 to 8. Here, the sensor is incorporated into the cap 22. As shown in FIGS. 4 and 8, the sensor has a first or transmit fiber 31 entering the cap on one side and a second or receive fiber 32 exiting on the other side. The optical fibers 31, 32 extend to a plug connector 33, which plugs into an electronics module (not shown) that can be incorporated into the servo controller for the RF matchwork system. A strain relief, e.g., in the form of a tape segment 34, secures the fibers to the outside of the cap 22.

Figure 5:
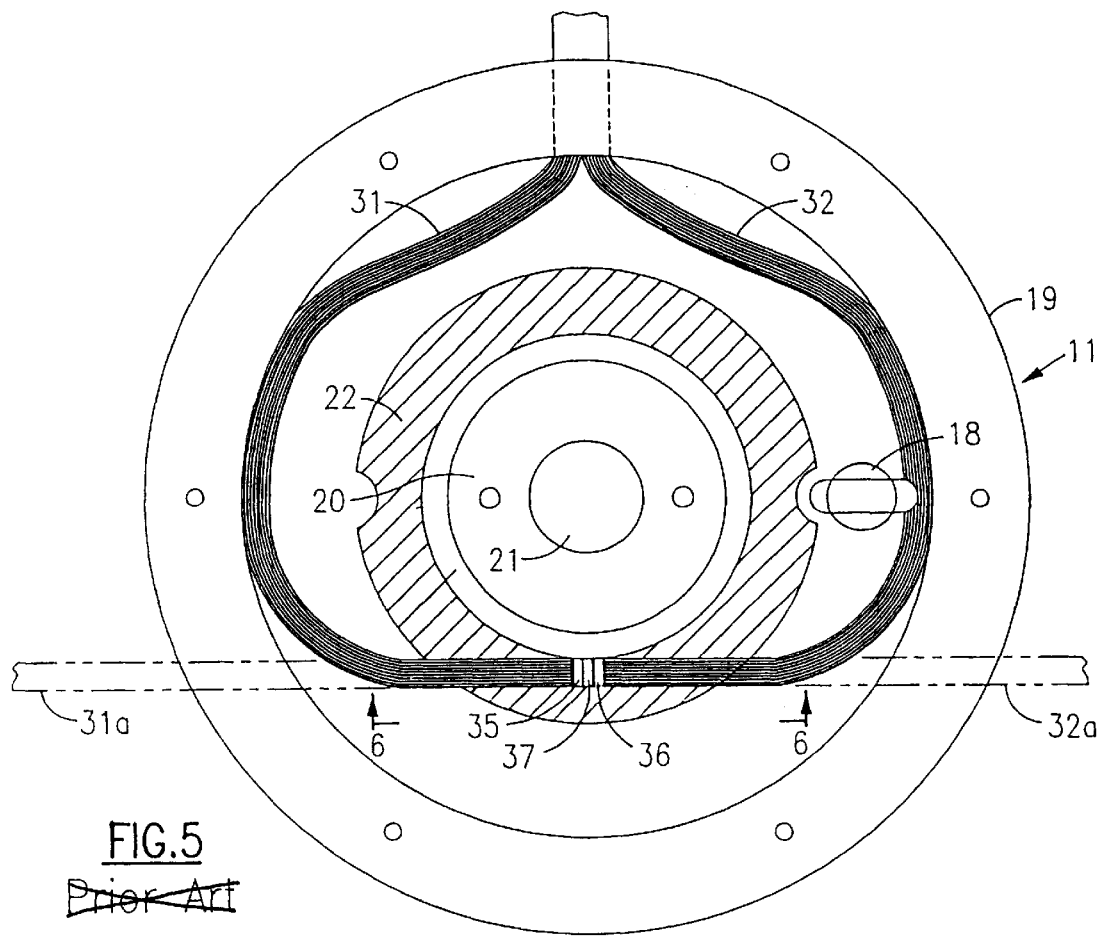
FIG. 5 is a plan view of the optical detector according to an embodiment of this invention.
Figure 6:
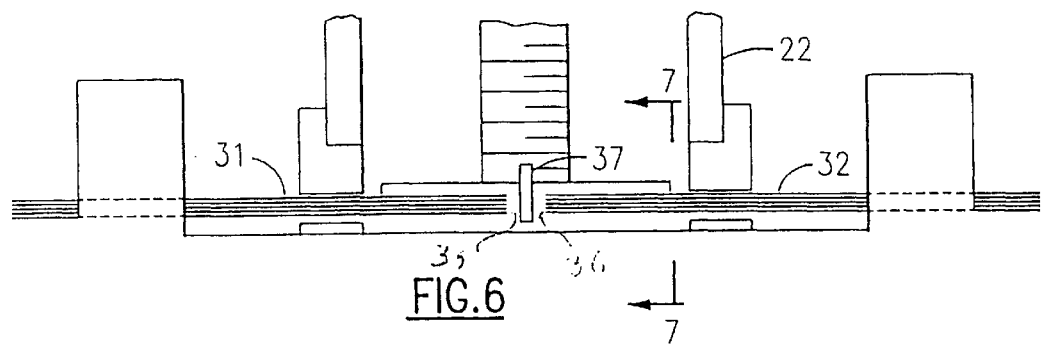
FIG. 6 is a sectional elevation taken at 6—6 of FIG. 5.
Figure 7:
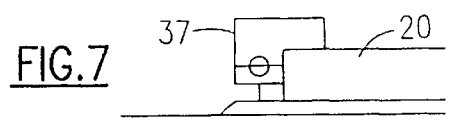
FIG. 7 is a partial elevation taken at 7—7 of FIG. 6.

As shown in FIGS. 5 to 7, the transmit and receive fibers 31, 32 pass through openings in the wall of the cap 22, and have respective termini 35 and 36 that are aligned optically with one another. The two fibers are positioned near the top 19 of the canister so as to be adjacent the nut 20 when it is in its home position. There is a small gap defined between terminus 35 and terminus 36. A flag 37 is affixed onto the nut 20 and is interposed in the gap between the termini 35, 36 when the nut 20 is at home position. The flag 37 is better shown in FIGS. 6 and 7. The flag 37 can be in the form of a flat metal member attached to the nut, or can be a flange formed with the nut. The flag 37 serves as a shutter to block the light path between the fibers when the nut 20 in the home position, but permits light to pass when the nut is raised above the home position. Consequently, the optical end position sensor operates as a "normally closed" or ON optical switch, and will be ON any time the capacitor 10 is driven away from home position, and OFF when at the home position. The controller operates to stop the rotation of the lead screw and halt downward motion of the nut and capacitor plates whenever an optical OFF condition is present. This means that in case of a sensor failure, e.g., a fiber break, the controller will stop rotation of the lead screw, and will not continue to hunt for the home position.

As shown in FIG. 8, the cap 22 can have an axial guide slot 38 corresponding to the position of the flag 37. This can serve to guide the movement of the flag 37, and also assists installation, so that the cap is properly installed with the fibers oriented with the flag.

An alternative arrangement is shown in ghost lines in FIG. 5, where fibers 31a, 32a are in a straight-through configuration, rather than passing through the cap and around.

Figure 9:
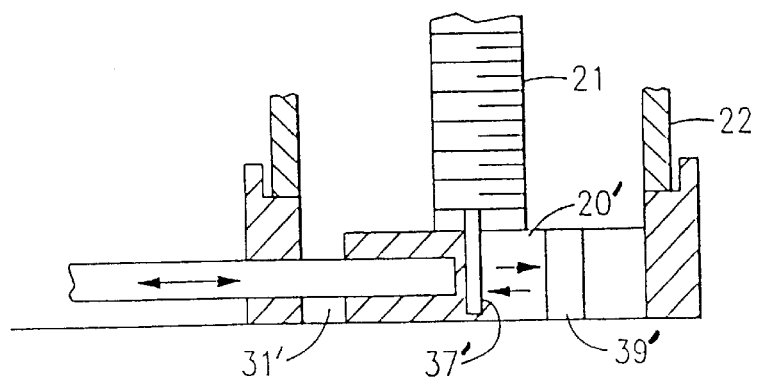
FIG. 9 is a sectional elevation showing a portion of another embodiment.

Another alternative embodiment is shown in FIG. 9, where elements identified in connection with FIG. 6 have the same reference number, with prime added. Here, there is a two-way optical fiber 31' (or, alternatively, both fibers 31 and 32 could enter the cap 22 in the same direction), so that the light beam exits the fiber at one side of the flag 37' position, is reflected from a reflector or mirrored surface 39' that is fixed with respect to the top 19' of the canister, and again enters the two-way optical fiber 31', when the nut 20' is out of its home position. At the home position, as shown here, the flag 37' blocks the light path, and an optical OFF signal indicates this fact.

As used in this specification, the terms "closed" and ON mean that the optic path (fiber 31 to fiber 32) is complete, while the terms "open" and OFF mean that the optic path is obstructed.

While the invention has been described above in respect to selected preferred embodiments of the invention, it should be understood that the invention is not limited to such embodiments. Rather, many modifications and variations will present themselves to persons skilled in the art without departure from the scope and spirit of the invention, which is defined in the appended claims.

I claim:

1. A sealed servo-type variable tuning capacitor comprising a hermetically sealed canister; a set of fixed plates within said canister; a set of movable plates meshed with the fixed plates and axially movable within the canister; a shaft affixed to said movable plates and moves axially with respect to said canister; a nut affixed non-rotatably on said shaft and having a female thread; a rotatable threaded lead screw fitted into said nut; means for controllably rotating said lead screw to move said nut, and thereby said movable plates, over a travel defined between a home position and at least one other position; and the improvement which comprises an optical indexing arrangement for detecting whether said nut and said movable plates are in said home position, including optical transmitter means generating an optical beam, optical receiver means oriented to receive said optical beam, said beam traveling on a path at a predetermined axial position within the travel of said nut; and flag means disposed on said nut to block said optical beam on said path when said nut is in home position, but being out of said path and permitting said optical beam to pass from said transmitter means to said receiver means when said nut is out of said home position.

2. The variable tuning capacitor of claim 1, wherein said optical transmitter means includes a first optical fiber having a terminus positioned adjacent said nut at the home position thereof.

3. The variable tuning capacitor of claim 2, wherein said optical receiver means includes an optical fiber having a terminus positioned adjacent said nut and aligned with the first optical fiber, the two termini defining a space therebetween.

4. The variable tuning capacitor of claim 3, wherein said flag means includes a flat shutter member that is positioned in said space when the nut is in said home position.

5. The variable tuning capacitor of claim 1, further comprising a cylindrical cap member seated on said canister, including means for supporting said lead screw, and having an interior to accommodate the travel of said nut; and wherein said cap member includes means to support said optical transmitter means and said optical receiver means.

6. The variable tuning capacitor of claim 5, wherein said cap member has an axially extending slot guide for orienting with said flag means.

7. A sealed servo-type variable tuning capacitor comprising a hermetically sealed canister; a set of fixed plates within said canister; a set of movable plates meshed with the fixed plates and axially movable within the canister; a shaft affixed to said movable plates and moves axially with respect to said canister; a nut affixed on said shaft; means for controllably moving said nut and said guide shaft, and thereby said movable plates, over an axial travel defined between a home position and at least one other position; and the improvement which comprises an optical indexing arrangement for detecting whether said nut and said movable plates are in their home position, including optical transmitter means generating an optical beam, optical receiver means oriented to receive said optical beam, said beam traveling on a path at a predetermined axial position within the travel of said nut; and flag means disposed on said nut to block said optical beam on said path when said nut is in said home position, but being out of said path and permitting said optical beam to pass from said transmitter means to said receiver means when said nut is out of said home position.

8. A variable tuning capacitor comprising a set of fixed plates within a canister; a set of movable plates meshed with the fixed plates; a shaft affixed to said movable plates and movable with respect to said fixed plates; a nut member mounted on said shaft; means for controllably moving said nut member, and thereby said movable plates, over a travel defined between a home position and at least one other position; and the improvement which comprises an optical indexing arrangement for detecting whether said nut member and said movable plates are in said home position, including optical transmitter means generating an optical beam, optical receiver means oriented to receive said optical beam, said beam traveling on a path at a predetermined axial position within the travel of said nut member; and flag means disposed on said nut member to block said optical beam on said path when said nut member is in said home position, but being out of said path and permitting said optical beam to pass from said transmitter means to said receiver means when said nut member is out of said home position.

9. In a tuning capacitor comprising a first and second plate, said first and second plate being parallel to each other; said first plate being movable in a vertical direction; a vertically moveable shaft attached to said first plate; the improvement comprises:

means for transmitting an optical beam; said optical beam transmitting means terminating inside said tuning capacitor;

a means for receiving said transmitted optical beam; said optical beam receiving means terminating inside said tuning capacitor; and a flag means, said flag means attached to said vertically moveable shaft and passing between said optical beam transmitting means and said optical beam receiving means, and blocking said optical beam transmitted from said optical beam transmitting means to said optical beam receiving means when said flag means is in a predetermined home position.

10. In a tuning capacitor comprising a first and second plate, said first and second plate being parallel to each other; said first plate movable in the vertical direction; the improvement comprising:

a means for transmitting an optical beam; said optical beam transmitting means terminating inside said tuning capacitor;

a means for receiving said transmitted optical beam; said optical beam receiving means terminating inside said tuning capacitor; and a flag means, said flag means being attached to said first plate and passing between said optical beam transmitting means and said optical beam receiving means, and blocking said optical beam transmitted from said optical beam transmitting means to said optical beam receiving means when said flag means is in a predetermined home position.

11. In a tuning capacitor comprising a first and second plate, said first and second plate being parallel to each other; said first plate being moveable in a vertical direction; the improvement comprising:

a means for transmitting and receiving an optical beam; and a flag means, said flag means being attached to said first plate and comprising a reflective surface, said reflective surface reflecting said optical beam transmitted from said transmitting and receiving means back to said transmitting and receiving means when said flag means is in a predetermined home position.

* * * * *

UNITED STATES PATENT AND TRADEMARK OFFICE
CERTIFICATE OF CORRECTION

PATENT NO. : 6,064,559
DATED : May 16, 2000
INVENTOR(S) : Richard E. CHURCH, Jr.

It is certified that error appears in the above-identified patent and that said Letters Patent are hereby corrected as shown below:

Column 6, line 63, change "their" to --said--.

Signed and Sealed this

Third Day of April, 2001

*Attest:*

NICHOLAS P. GODICI

*Attesting Officer*    *Acting Director of the United States Patent and Trademark Office*